United States Patent [19]

Harrison

[11] Patent Number: 5,118,019
[45] Date of Patent: Jun. 2, 1992

[54] AUTOMOBILE FUEL TANK FUEL CAP HOLDER

[76] Inventor: Terry W. Harrison, 8831 Haskell Dr., Broken Arrow, Okla. 74014

[21] Appl. No.: 638,066

[22] Filed: Jan. 4, 1991

Related U.S. Application Data

[63] Continuation of Ser. No. 413,111, Sep. 27, 1989, abandoned.

[51] Int. Cl.⁵ .............................................. B60R 11/00
[52] U.S. Cl. ............................. 224/42.46 R; 224/273; 224/901; 383/33; 383/103; 383/117; 383/907
[58] Field of Search ................. 224/273, 901, 42.46 R; 220/DIG. 23, 85 CH, 379; 383/103, 102, 33, 117, 120, 11, 100, 907, 34.1, 34, 43; 206/806; 150/900

[56] References Cited

U.S. PATENT DOCUMENTS

| 1,338,375 | 4/1920 | Kleidman | 383/34 |
|---|---|---|---|
| 1,915,196 | 6/1933 | McGuire | 383/102 |
| 2,040,271 | 5/1936 | Rosenzweig | 383/43 |
| 2,074,843 | 3/1937 | Hiering | 383/34 |
| 2,527,746 | 10/1950 | Lawrence | 383/33 |
| 2,839,201 | 6/1958 | Auster | 220/379 |
| 3,133,690 | 5/1964 | Lui | 383/11 |
| 3,516,670 | 2/1971 | Segal | 383/11 |
| 3,589,595 | 6/1971 | White | 383/33 |
| 4,654,711 | 3/1987 | Marshell | 224/273 |
| 4,811,765 | 3/1989 | Giha | 220/DIG. 33 |

Primary Examiner—Linda J. Sholl
Attorney, Agent, or Firm—Head & Johnson

[57] ABSTRACT

A gas cap holder attaches to the inside face of an automobile fuel tank access door. The holder consists of a receptacle which has a resiliently collapsible open mouth at its top. The bottom of the receptacle is a planar edge. Flexible walls taper from the open mouth to the tapered edge and the rear wall is flat and abuts the interior wall of the automobile fuel tank access door. The holder is held in place on the access door by a segment of double back tape which extends across the upper portion of the rear wall of the receptacle. Preferably, the receptacle will be made of an open mesh flexible plastic, however, a solid thin film of material may also be used. In receptacles made of a solid film of material, aperatures may be provided along the bottom edge to permit liquids to drain out of the receptacle.

16 Claims, 2 Drawing Sheets

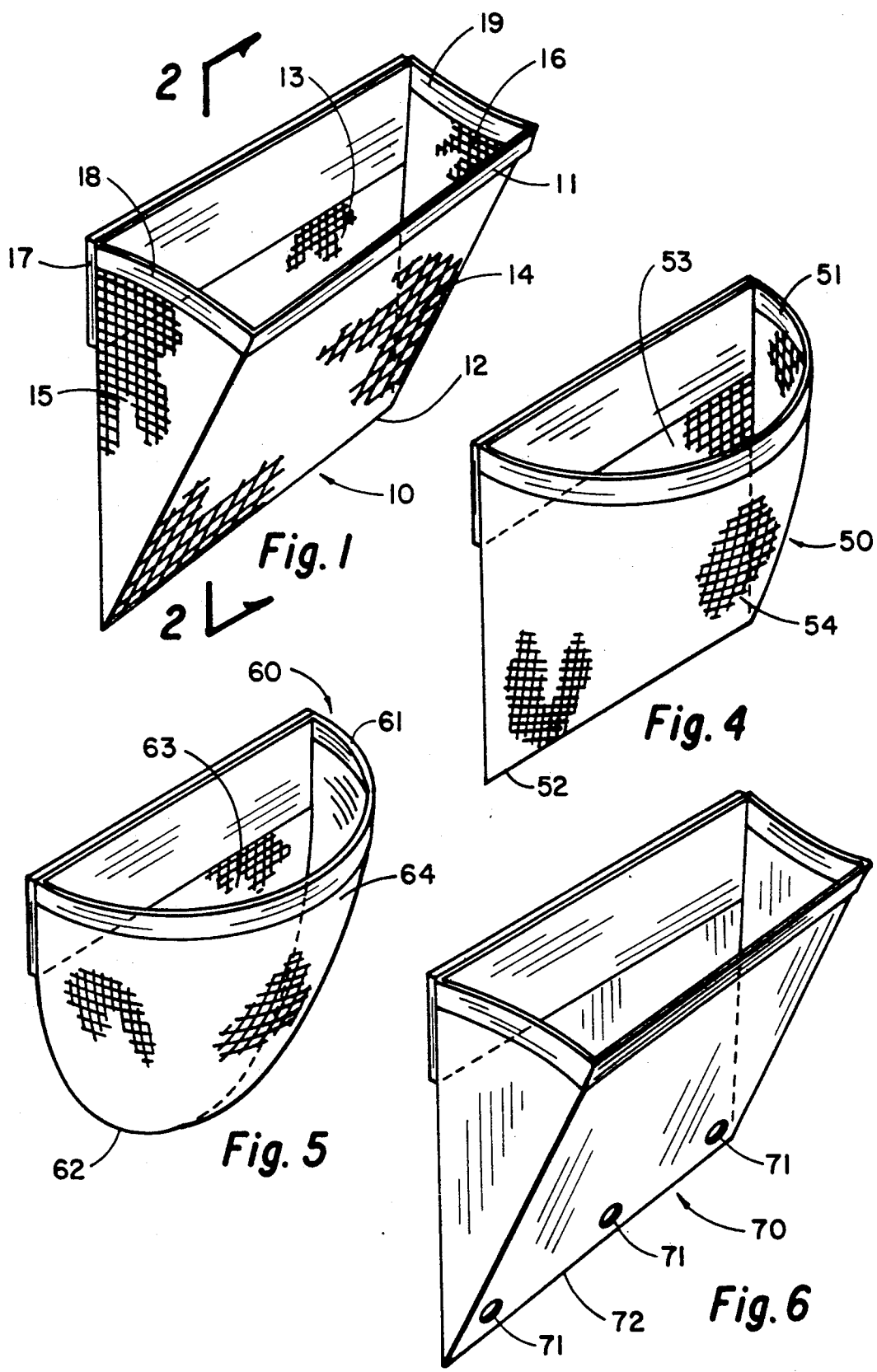

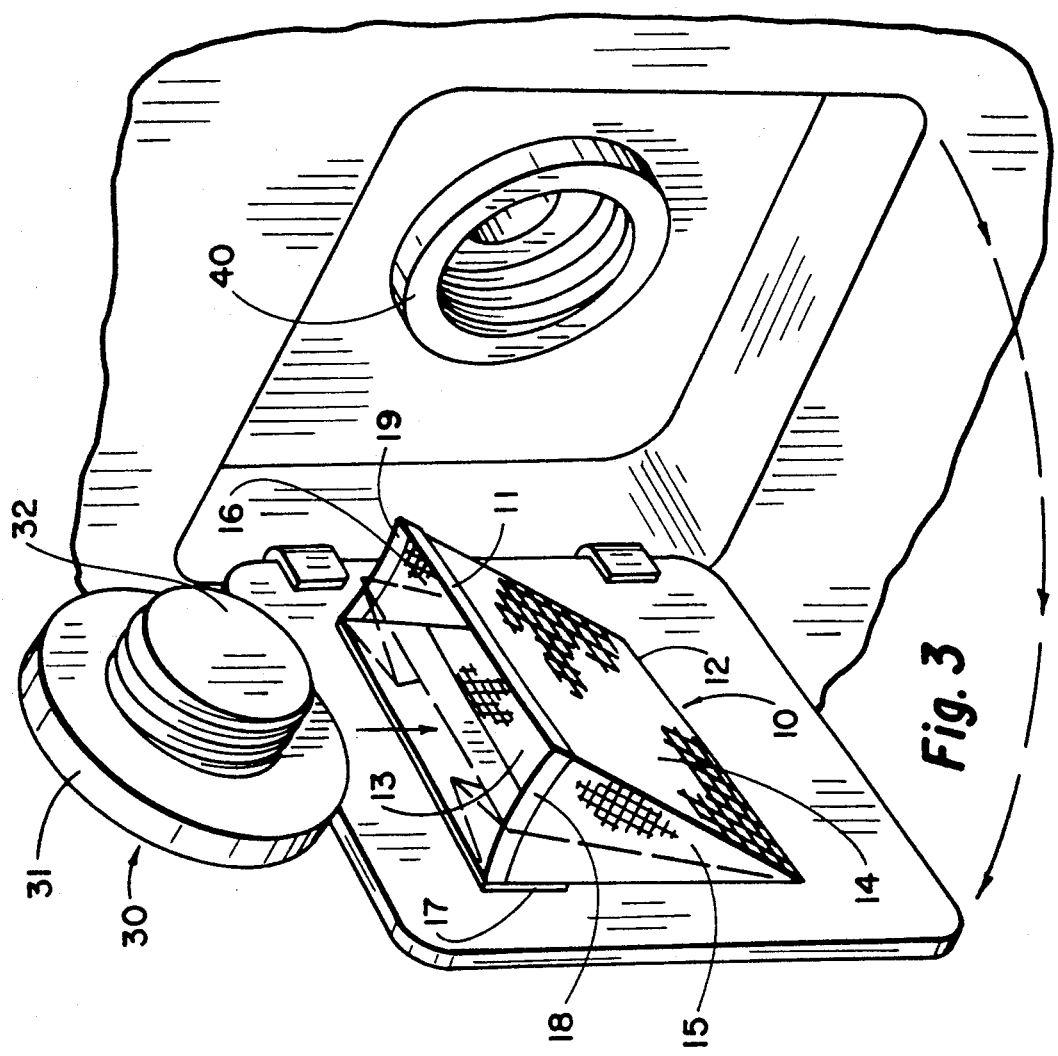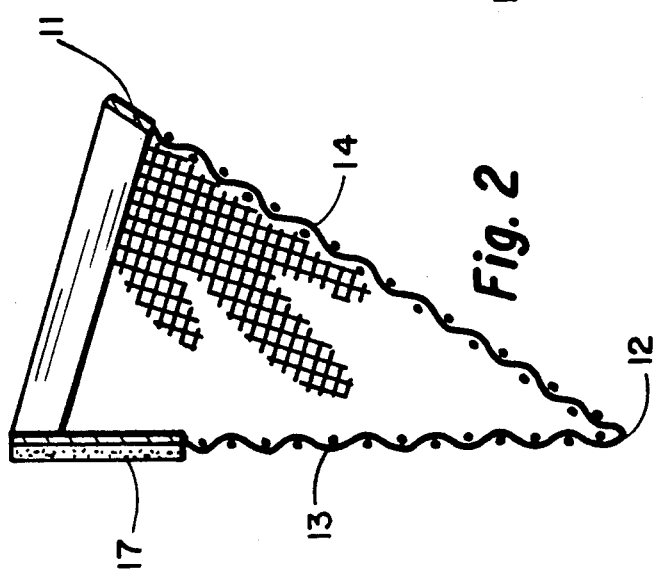

AUTOMOBILE FUEL TANK FUEL CAP HOLDER

This is a continuation of copending application Ser. No. 07/413,111 filed on Sept. 27, 1987, now abandoned.

BACKGROUND OF THE INVENTION

This invention relates generally to automobile fuel tank accessories and more particularly concerns holders for automobile gas caps.

Widespread acceptance of consumer operated gasoline pumps has introduced the consumer to a frustrating new problem. What do you do with the gas cap while you are filling your tank?

Some consumers place the cap in the hinging apparatus associated with the fuel tank access door. This eventually results in nicks and corrosion on the access door or the exterior surface of the automobile due to contact with the rigid portions of the cap or from the corrosive effects of gasoline deposits on the cap. Other consumers place the cap on top of the gas station fuel pump or any other flat surface that might be available in the vicinity of the fuel pump. Gas caps placed in such locations during refueling are not infrequently left in those locations as the consumer drives away. Less frequently, but more costly, the caps collect some of the loose dirt and grime found around gasoline pumps which eventually find their way into the gasoline tank and sometimes into the fuel line, causing inefficiency in and perhaps complete blockage of the fuel line.

Some automobile manufacturers have sought to overcome the problem by providing a chain, strap or tether which connects the gas cap to the fuel access port. While such devices prevent the inadvertent loss of a fuel cap, they are generally either too long, causing further chipping and corrosion problems, or due to the inherent design of gas tank openings, it will hold the cap in line or adjacent the refueling process allowing the cap to become wet with fuel. Another source of irritation is when the tether is too short, which will not allow the cap to be removed or replaced with ease. For these reasons, not all new automobiles incorporate such a device.

After-purchase accessories have been developed which are intended to solve these problems, but no adequate accessory has yet been found. For example, magnets have been attached to the inside surface of the automobile fuel tank access door so that the gas cap can be magnetically held in place during the refilling process. However, such magnets are generally either so weak that they cannot safely secure the gas cap or so strong that the gas cap cannot be removed without exerting forces on the access door and its operating mechanisms beyond those they were designed to take. A magnet will attract solid objects that could find their way into the fuel tank. Also, the possibility of a spark is a reality when ferrous metal is brought in contact with each other. The magnetic attraction of the cap could produce disastrous results. Furthermore, not all gas caps are now made of material that can be secured by a magnet. Similar difficulties are encountered with holders fixed to the inside of the access door having a slot or hole into which a portion of the gas cap is inserted in such a way that the device grips the gas cap. Insertion of the cap into the holder is generally not a very difficult process, but removal can be a task if the holder is successful in tightly grasping the gas cap. Either of these types of holder further has the irritable consequence of bringing the consumer's hands into contact with portions of the gas cap which impart the odor of gasoline to the consumer's hands, an odor which is not readily eliminated.

It is, therefore, an object of this invention to provide a gas cap holder attachable to the inside face of an automobile fuel tank access door into which a gas cap may be readily inserted and from which a gas cap can be readily removed. It is also an object of this invention that the insertion into or removal of a gas cap from the holder will not result in any appreciable forces being exerted on the automobile fuel tank access door or its operating mechanisms. It is a further object of this invention to provide a gas cap holder that minimizes the chipping and corrosion problems frequently encountered with such devices. And it is an object of this invention to provide a holder that minimizes the possibility of inadvertent fuel spills on the cap. An object is also the loss of the gas cap during refueling.

SUMMARY OF THE INVENTION

In accordance with the invention a gas cap holder is attachable to the inside face of an automobile fuel tank access door. The holder consists of a receptacle which has a resiliently collapsible open mouth at its top. The bottom of the receptacle has a planar edge. Flexible walls taper from the open mouth to the planar edge. The receptacle has a flat, rear wall, the exterior surface of which will abut the interior wall of the automobile fuel tank access door. The holder is held in place on the access door by a segment of double back tape which extends across the upper portion of the rear wall of the receptacle. The receptacle mouth may be rectangular or D-shaped. The rear wall has a straight upper edge, and is preferably, but not necessarily, a square.

In a preferred embodiment the receptacle will be made of a flexible, open mesh plastic or other suitable material. A solid thin film of material may also be used. When mesh material is used, the upper portion of the rear wall of the receptacle will preferably be a solid, thin film to accommodate fixation of the double back tape. In receptacles using solid material, apertures may also be provided along the bottom edge to permit liquids to drain out of the receptacle.

BRIEF DESCRIPTION OF THE DRAWINGS

Other objects and advantages of the invention will become apparent upon reading the following detailed description and upon reference to the drawings in which:

FIG. 1 is a perspective view illustrating a rectangular mouth embodiment of the invention formed from open mesh material;

FIG. 2 is a cross section of the embodiment of FIG. 1 taken along lines 2—2;

FIG. 3 is a perspective view of the embodiment of FIG. 1 mounted on the inside face of an automobile fuel tank access door and illustrating the closed condition of the holder in dotted lines;

FIG. 4 is a perspective view illustrating the D-shape mouth embodiment of the invention having a straight bottom edge;

FIG. 5 is a perspective view illustrating the D-shape mouth embodiment of the invention having an arcuate bottom edge;

FIG. 6 is a perspective view of a rectangular mouth embodiment of the invention formed from a solid thin film of material.

While the invention will be described in connection with preferred embodiments thereof, it will be understood that it is not intended to limit the invention to those embodiments. On the contrary, it is intended to cover all alternatives, modifications and equivalents as may be included within the spirit and scope of the invention as defined by the appended claims.

DETAILED DESCRIPTION OF THE INVENTION

One embodiment of the present gas cap holder is illustrated in FIGS. 1 and 2. The holder consists of a receptacle 10 having a resiliently collapsible rectangular open mouth 11 at its top and a planar edge 12 along its bottom. The receptacle 10 has flat rectangular rear and front walls 13 and 14 and triangular side walls 15 and 16 which taper from the mouth 11 to the planar edge 12. A segment of double back tape 17 is fixed to the upper portion of the rear wall 13. The receptacle 10 is preferably formed from an integral flexible open meshed plastic or other suitable material. The mouth 11 is sufficiently thick so as to stay naturally in the open rectangular condition but capable of being resiliently collapsed under force toward the rear wall 13 of the receptacle FIG. 3 illustrates this embodiment of the gas cap holder mounted on the inside face of an automobile fuel tank access door 20. With the gas cap door 20 in the open position shown, the resiliently collapsible mouth 11 of the receptacle 10 will be in the open condition. In this open condition, the gas cap 30 can be removed from the intake line 40 to the gas tank (not shown) and readily inserted into the receptacle 10 with the flat surface 31 of the cap 30 parallel to the rear wall 13 of the receptacle 10 and the handle portion 32 of the cap 30 against the front wall 14 of the receptacle 10. When the gas cap 30 is being replaced on the fuel intake line 40, the collapsible quality of the mouth 11 permits the upper side edges 18 and 19 of the mouth 11 to fold, as shown by dotted lines, and comfortably fit within the closed fuel tank access door. Since there are no gripping mechanisms associated with the receptacle 10, cap 30 is easily insertable into and removable from the receptacle 10. The open mesh material of the receptacle 10 permits liquids to freely drain out of the receptacle 10.

FIG. 4 illustrates another embodiment of the holder in which the receptacle 50 has a D-shaped, resiliently collapsible open mouth 50, a planar edge 52 at its bottom, a rear wall 13 which is rectangular or trapezoidal and the remainder of the receptacle wall 54 tapering from the mouth 51 to the planar edge 52.

FIG. 5 illustrates another embodiment of the gas cap holder employing a D-shaped, resiliently collapsible open mouth 61 and having an arcuate planar bottom edge 62. In this embodiment, or variations of it, the rear wall 63 of the receptacle 60 is substantially semi-circular or semi-elliptical and the remaining wall 64 of the receptacle 60 tapers from the mouth 61 to the arcuate planar edge 62.

FIG. 6 illustrates an embodiment of the gas cap holder similar in all respects to that of FIG. 1 except that the receptacle material is a solid thin film rather than an open mesh material. In this embodiment, one or more apertures 71 may be provided proximate the bottom edge 72 of the receptacle 70 so that liquids may drain out of the receptacle.

It will be noted from the above embodiments that many variations in the configuration of the mouth of the receptacle, the configuration of the bottom edge of the receptacle and the material from which the receptacle is formed are possible. The embodiments shown are intended to be illustrative of these variations. While the invention has been described in connection with these embodiments, it is evident that many alternatives, modifications and variations will be apparent to those skilled in the art in light of the foregoing description. Accordingly, it is intended to embrace all such alternatives, modifications and variations as fall within the spirit of the appended claims.

What is claimed is:

1. For attachment to the inside face of an automobile fuel tank access door, a gas cap holder comprising:
   a receptacle having collapsible mouth at its top, a planar edge at its bottom and flexible walls tapering from said mouth to said edge, a flat rear wall and flexibly resilient means disposed on and biasing said mouth to substantially open condition in the absence of collapsing force exerted thereon; and
   means disposed on a portion of the exterior surface of said rear wall for securing said receptacle to the inside face of the fuel tank access door.

2. A gas cap holder according to claim 1, said open mouth being of D-shaped configuration.

3. A gas cap holder according to claim 1, said open mouth being of rectangular configuration.

4. A gas cap holder according to claims 1, 2 or 3, said rear wall being rectangular.

5. A gas cap holder according to claims 1, 2 or 3, said rear wall being square.

6. A gas cap holder according to claims 1, 2 or 3, said securing means comprising a segment of double backed tape.

7. A gas cap holder according to claims 1, 2 or 3 further comprising means for permitting liquids to drain out of said receptacle.

8. For attachment to the inside face of an automobile fuel tank access door, a gas cap holder comprising:
   a receptacle align a collapsible D-shaped mouth at its top, a planar edge at its bottom and flexible walls tapering from said mouth to said edge, said receptacle having a flat, rectangular rear wall and flexibly resilient means disposed on and biasing said mouth into a substantially D-shaped condition in the absence of collapsing force exerted thereon; and
   means disposed on a portion of the exterior surface of said receptacle wall for securing said rear wall to the inside face of the fuel tank access door.

9. A gas cap holder according to claim 8, said walls being formed of an open mesh material.

10. A gas cap holder according to claim 9, said rear wall having a solid horizontal upper band and said securing means comprising a segment of double backed tape fixed to the exterior surface of said solid horizontal upper band of said rear wall.

11. A gas cap holder according to claims 8, 9 or 10, said rear wall being square.

12. For attachment to the inside face of an automobile fuel tank access door, a gas cap holder comprising:
   a receptacle having a collapsible rectangular mouth at its top, a planar edge at its bottom, triangular flexible side walls tapering from said mouth to said edge flat, rectangular front and rear walls and flexible resilient means disposed on and biasing said mouth into a substantially rectangular condition in the absence of collapsing force exerted thereon; and means disposed on a portion of the exterior surface of said rear wall for securing said receptacle to the inside face of the fuel tank access door.

13. A gas cap holder according to claim 12, said walls being formed of an open mesh material.

14. A gas cap holder according to claim 13, said rear wall having a solid horizontal upper band and said securing means comprising a segment of double backed tape fixed to the exterior surface of said solid horizontal upper band of said rear wall.

15. A gas cap holder according to claims 12, 13 or 14, said rear wall being square.

16. In combination with an automobile fuel tank access door, a gas cap holder comprising:
 a receptacle having a collapsible mouth at its top, a planar edge at tis bottom and flexible walls tapering from said mouth to said edge, a flat rear wall and flexibly resilient means disposed on and biasing said mouth to a substantially open condition in the absence of collapsing force exerted thereon; and
 means disposed on a portion of the exterior surface of said rear wall for securing said receptacle to an inside face of said fuel tank access door.

* * * * *